United States Patent [19]

Shibata et al.

[11] Patent Number: 5,713,969
[45] Date of Patent: Feb. 3, 1998

[54] ABRASIVES COMPOSITION AND PROCESS FOR PRODUCING SUBSTRATE FOR MAGNETIC RECORDING MEDIUM

[75] Inventors: Manabu Shibata; Tomokazu Togo, both of Tochigi-ken, Japan

[73] Assignee: Kao Corporation, Tokyo, Japan

[21] Appl. No.: 774,368

[22] Filed: Dec. 27, 1996

[30] Foreign Application Priority Data

Dec. 27, 1995 [JP] Japan .................................... 7-341720

[51] Int. Cl.$^6$ ........................................................ B24D 3/34
[52] U.S. Cl. .................... 51/307; 451/28; 451/41
[58] Field of Search ............................... 451/28, 41, 285, 451/287, 288; 51/307

[56] References Cited

U.S. PATENT DOCUMENTS

| | | | |
|---|---|---|---|
| 3,929,987 | 12/1975 | Colodney et al. | 424/52 |
| 4,108,979 | 8/1978 | Muhler et al. | 424/49 |
| 4,146,605 | 3/1979 | Ritchey | 424/49 |
| 4,645,662 | 2/1987 | Nakashima et al. | 424/52 |
| 4,935,039 | 6/1990 | Miyazaki et al. | 51/309 |
| 5,178,869 | 1/1993 | Ebine et al. | 424/401 |
| 5,443,604 | 8/1995 | Stowell | 51/307 |

FOREIGN PATENT DOCUMENTS

| | | |
|---|---|---|
| 2-14280 | 1/1990 | Japan . |
| 4-38788 | 6/1992 | Japan . |
| 6-339853 | 12/1994 | Japan . |

*Primary Examiner*—James G. Smith
*Assistant Examiner*—Derris H. Banks
*Attorney, Agent, or Firm*—Oblon, Spivak, McClelland, Maier & Neustadt, P.C.

[57] ABSTRACT

Abrasives compositions for the production of substrates for magnetic recording media which comprise an abrasive, an abrasion accelerator, and water, in which the abrasives composition contains 0.02 to 0.4% by weight of aluminum lactate as the abrasion accelerator, are capable of imparting a low surface roughness to substrates and abrading at a high speed.

20 Claims, 2 Drawing Sheets

ABRASIVES COMPOSITION AND PROCESS FOR PRODUCING SUBSTRATE FOR MAGNETIC RECORDING MEDIUM

BACKGROUND OF THE INVENTION

1. Field of the Invention

The present invention relates to abrasives compositions for use in the production of substrates for magnetic recording media. The present invention particularly relates to abrasives compositions, which are capable of imparting a low surface roughness to substrates for magnetic recording media so that information can be recorded on the magnetic recording media at high densities, and which are capable of abrading the substrate at a high speed. The present invention also relates to a process for producing substrates for magnetic recording media, wherein such an abrasives composition is utilized.

2. Discussion of the Background

With the reduction in the size of computers and the increase in the operation speed of computers, in recent years, external storage devices are now required to have large storage capacities and to allow high-speed access. Among the external storage devices for computers, magnetic disk drive units have found wide applications by virtue of their large storage capacity and their capability of allowing high-speed access. Also, recently, small personal computers, such as notebook personal computers, which are portable, have become popular. Therefore, it is increasingly required for magnetic disks, which are to be used in such small personal computers, to made small in size and to be capable of recording information at high densities. Accordingly, the thickness of the magnetic disks should be reduced and the durability of the magnetic disks with respect to impact during conveyance should be kept high. However, it is difficult to make the thickness of the magnetic disks small and, at the same time, improving their durability.

Currently-used magnetic disk substrates, typically hard disk substrates, include aluminum substrates and glass substrates which have been conventionally used, and carbon substrates which have attracted particular attention for enabling enhancement of impact resistance, weight reduction with small thickness, reduction in motor power requirement by weight reduction, and the like. Particularly, when carbon substrates are used as the substrates for magnetic disks, the durability of the magnetic disks can be enhanced.

Ordinarily, carbon substrates are produced in the manner described below.

Specifically, a curing agent is added to a liquid raw resin. The resulting mixture is sandwiched between a pair of glass plates, and the raw resin is cured to a predetermined thickness. Thereafter, the cured resin is taken out of the glass plates and shaped into a disk and cored. In this manner, a plurality of cured resin pieces (cured resin substrates) of a disk shape are obtained. Thereafter, the cured resin pieces are successively overlaid upon a graphite plate (carbon plate), introduced into a calcination furnace, and calcined at a predetermined temperature. The cured resin pieces are thereby carbonized, and a carbon substrate is thus obtained.

To obtain the flatness/surface roughness required for the final product, a lapping step of abrading the surface and a chamfering step of grinding and chamfering the outer circumferential edge and the inner circumferential edge are carried out, and a polishing step for the final abrasion is then carried out.

Further, in order that information may be recorded at high densities on a magnetic recording medium, it is required for the surface of the substrate for the magnetic recording medium to have a low surface roughness and a high accuracy. Therefore, there is a strong demand for a good abrasive processing technique, which is to be used in, particularly, the lapping step and the polishing step for carbon substrates, that have a high hardness and are brittle, and substrates for magnetic recording media, which substrates have the performance described above.

In order to satisfy the demands described above, an abrasive processing method for polishing a carbon substrate by using water, alumina abrasives, and an abrasion auxiliary has been proposed in, for example, Japanese Patent Application Laid-Open 6-339853. The proposed abrasive processing method is characterized by the use of aluminum nitrate, aluminum chloride, or the like, as the abrasion auxiliary.

The carbon substrates obtained with the aforesaid abrasive processing method have a certain low level of surface roughness. However, with the aforesaid abrasive processing method, carbon substrates having a lower surface roughness, which is necessary to achieve the recording of information at higher densities, cannot be obtained. Also, aluminum nitrate, which is used in the aforesaid abrasive processing method is, toxic, and therefore particular care must be taken in the handling of aluminum nitrate.

Further, Japanese Patent Application Laid-Open 2-14280 discloses a composition for abrasive processing of a plastic material, comprising water, α-alumina, and an abrasion accelerator selected from the group consisting of aluminum oxalate and aluminum lactate, wherein the content of the abrasion accelerator is 0.5% to 10%, by weight. However, when a carbon substrate and a glass substrate, which have a high hardness and are brittle, are abraded with the disclosed composition, it is difficult to achieve the low surface roughness required for substrates for magnetic recording media.

Furthermore, Japanese Patent Publication 4-38788 discloses the use of a composition for abrasive processing, comprising water, alumina abrasives, an abrasion accelerator (gluconic acid or lactic acid), and a surface modifier (colloidal alumina), such that the surface roughness of an aluminum magnetic disk substrate may be reduced to a low value. However, the disclosed composition for abrasive processing is not satisfactory for reducing the surface roughness of a carbon substrate or a glass substrate, which has a high hardness and is brittle, to a low value.

Thus, there remains a need for abrasives compositions which are useful for the production of substrates for magnetic recording media, in particular carbon, glass, and NiP-plated aluminum.

SUMMARY OF THE INVENTION

Accordingly, it is one object of the present invention to provide novel abrasives compositions useful for the production of substrates for magnetic recording media.

It is another object of the present invention to provide novel abrasives compositions, useful for the production of substrates for magnetic recording media, which are capable of imparting a low surface roughness to substrates fop magnetic recording media so that information can be recorded on the magnetic recording media at high densities.

It is another object of the present invention is to provide novel abrasives compositions, useful for the production of substrates for magnetic recording media, which are capable of abrading such substrates at high speed.

It is another object of the present invention to provide novel abrasives compositions useful for the production of substrates for magnetic recording media, which are capable of imparting a low surface roughness to such substrates so that information can be recorded on the magnetic recording media at high densities, and capable of abrading such substrates at a higher speed.

It is another object of the present invention to provide a novel process for producing substrates for magnetic recording media.

It is another object of the present invention to provide a novel process for producing substrates for magnetic recording media which imparts a low surface roughness to the substrates so that information can be recorded on the magnetic recording media at high densities.

It is another object of the present invention to provide a novel process for producing substrates for magnetic recording media, which abrades the substrate at high speeds.

It is another object of the present invention to provide a novel process for producing substrates for magnetic recording media, such substrates being carbon, glass, or NiP-plated aluminum.

These and other objects, which will become apparent during the following detailed description, have been achieved by the inventors' discovery that the surface roughness of a substrate can be reduced to a low value and the abrasion speed can be enhanced by the use of an abrasives composition for the production of magnetic recording medium substrate, comprising a specific abrasive accelerator at a specific concentration.

Thus, in a first embodiment, the present invention provides an abrasives composition, comprising (i) an abrasive;

(ii) an abrasion accelerator, and (iii) water, wherein the abrasion accelerator is aluminum lactate and the abrasion accelerator is present in an amount of 0.02 to 0.4% by weight, based on the total weight of the composition.

In a second embodiment, the present invention provides a process for producing a substrate for a magnetic recording medium, comprising abrading the substrate with an abrasives composition, wherein the improvement comprises the abrasives composition comprising:

(i) an abrasive;

(ii) an abrasion accelerator; and (iii) water, wherein the abrasion accelerator is aluminum lactate and the abrasion accelerator is present in an amount of 0.02 to 0.4% by weight, based on the total weight of the composition.

With the abrasives composition for the production of substrates for magnetic recording media and the process for producing substrate for magnetic recording media in accordance with the present invention, a low surface roughness can be imparted to the substrate, so that information can be recorded on the magnetic recording medium at high densities. Also, the abrasive processing of the substrates can be carried out at a high speed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
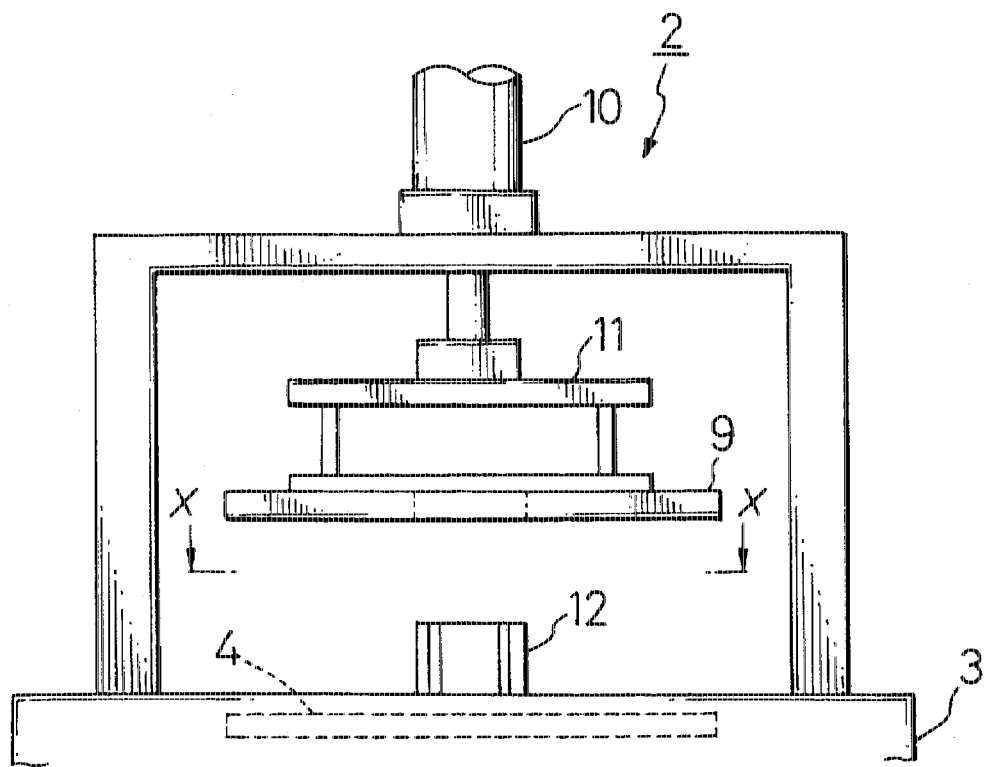
FIG. 1 is a schematic front view showing a double-face abrasive processing machine, which may be used in a polishing step for a carbon substrate.

Firstly, the abrasives composition for the production of substrates for magnetic recording media in accordance with the present invention (hereinbelow often referred to as the "abrasives composition") will be described in detail.

As described above, the abrasives composition in accordance with the present invention is characterized in that 0.02 to 0.4% by weight of aluminum lactate is contained as the abrasion accelerator.

In the abrasives composition in accordance with the present invention, aluminum lactate is used as the abrasion accelerator so that the abrasion speed of the substrate may be kept markedly high and so that the safety during the handling may be ensured. However, in the abrasives composition in accordance with the present invention, other abrasion accelerators, such as aluminum oxalate, aluminum nitrate, and aluminum chloride, may be used together with aluminum lactate. When such other abrasion accelerators are used, aluminum lactate serves as a main component.

The proportion of the abrasion accelerator in the abrasives composition in accordance with the present invention is 0.02% to 0.4% by weight, preferably 0.05% to 0.4% by weight, based on the total weight of the composition. When the proportion of the abrasion accelerator in the abrasives composition in accordance with the present invention falls within the aforesaid range, the low surface roughness, which is necessary to achieve the recording of information at high densities on the magnetic recording media, can be imparted to the substrate, and the substrates can be abraded more quickly. Specifically, if the proportion of the abrasion accelerator in the abrasives composition in accordance with the present invention is less than 0.02% by weight, it will become impossible to obtain an abrasion speed, which is higher than the abrasion speed obtained when aluminum nitrate is used as the abrasion accelerator as in the conventional technique. Also, if the proportion of the abrasion accelerator in the abrasives composition in accordance with the present invention is higher than 0.4% by weight, even though the abrasion speed is high, a sufficiently low surface roughness cannot be obtained, and the cost cannot be kept low.

Examples of the abrasive for use in the abrasives composition include alumina abrasives which contain aluminum oxide ($Al_2O_3$) as a main component, silica abrasives, and the like. The alumina abrasive may be classified in accordance with the particle size and properties into ground alumina type abrasive, hexagonal tabular alumina type abrasives, calcined alumina type abrasives, and the like. In the present invention, the type of the alumina abrasive may be selected in accordance with the quality of the final product. As the silica abrasive, Nalco 2360 colloidal silica supplied by NALCO CO., LUDOX supplied by DOW CORNING CO., or the like can be used. Among the above-enumerated abrasives, alumina abrasives are preferred for an enhanced abrasion speed. In particular, the hexagonal tabular alumina type abrasive and the calcined alumina type abrasive are preferred with respect to little occurrence of defects on the surface of the substrate.

The particle size of the abrasive may be selected appropriately in accordance with the quality of the final product. Ordinarily, the mean particle size of primary particles of the abrasive is preferably 0.001 μm to 6 μm, and more preferably 0.01 μm to 3 μm. When the mean particle size of primary particles falls within the aforesaid range, it is easy to process the substrate to a low surface roughness without lowering the abrasion speed.

The mean particle size of primary particles is measured by adding a dispersant to 0.1 g of an abrasive, followed by dispersing the abrasive by ultrasonic waves, drying the abrasive, and observing the dried abrasive with SEM, and carrying out image analysis.

The maximum particle size of the abrasive may be selected appropriately in accordance with the quality of the final product. Ordinarily, the maximum particle size of primary particles is preferably 15 μm or less, more preferably 6 μm or less. When the maximum particle size of primary particles is 15 μm or less, the substrate can be processed in such a manner that the occurrence of defects on the surface of the substrate may be restricted.

The maximum particle size of primary particles can be obtained by the same measuring method as that for the mean particle size.

The abrasives are used in the dispersed state or in the non-dispersed state (i.e., in the so-called "slurry state") in the abrasives composition in accordance with the present invention. The content of the abrasive in the abrasives composition in accordance with the present invention may be selected in accordance with the viscosity of the abrasives composition, the quality required for the product, or the like. Ordinarily, the amount of the abrasive in the abrasives composition in accordance with the present invention is preferably 0.05% to 30% by weight, and more preferably 0.1% to 25% by weight, based on the total weight of the composition. When the content of the abrasive in the abrasives composition in accordance with the present invention is less than 0.05% by weight, there will be the risk that, during the abrasive processing with an abrasive pad, the abrasive pad comes into direct contact with the substrate and causes the substrate to be scratched. When the content of the abrasive in the abrasives composition in accordance with the present invention is larger than 30% by weight, there will be the risk that the surface roughness of the abraded substrate becomes high.

The abrasives composition in accordance with the present invention can be obtained by dispersing the abrasion accelerator and the abrasive in water or by mixing them with water into the slurry state. As water, it is possible to use purified water, distilled water, service-water, or the like. The proportion of water in the abrasives composition in accordance with the present invention is preferably 69.6% to 99.93% by weight, and is more preferably 75% to 99% by weight, based on the total weight of the composition. When the proportion of water in the abrasives composition in accordance with the present invention is less than 69.6% by weight, there will be the risk that the dispersibility of the abrasives becomes low, and the surface roughness of the abraded substrate becomes high. When the proportion of water in the abrasives composition in accordance with the present invention is larger than 99.93% by weight, there will be the risk that a high abrasion speed cannot be obtained.

When necessary, besides the abrasion accelerator and the abrasive, other components may also be added to the abrasives composition in accordance with the present invention. Examples of such other components include a thickening agent, a dispersing agent for the abrasive, and a dispersing agent for the particles or powders produced by the abrasion of the substrate. The amount of these other components in the abrasives composition in accordance with the present invention is preferably 0.01% to 10% by weight, based on the total weight of the composition.

The pH value of the abrasives composition in accordance with the present invention is preferably 3.0 to 5.5, and more preferably 3.2 to 5.0. When the pH value of the abrasives composition in accordance with the present invention is less than 3.0, there is the risk that adverse effects may occur with respect to corrosion of metal parts of the abrasive processing apparatus. When the pH value of the abrasives composition in accordance with the present invention is higher than 5.5, there is the risk that a high abrasion speed cannot be obtained. The pH value of the abrasives composition can be adjusted to fall within the aforesaid range by adding an acid, such as acetic acid, or an alkali, such as sodium bicarbonate, to the abrasives composition.

The preparation of the abrasives composition in accordance with the present invention is preferably carried out by independently dispersing a prescribed amount of the abrasion accelerator (i.e., aluminum lactate) and a prescribed amount of the abrasive particles in water, mixing the two dispersions together, adding, when necessary, the above-mentioned other components, and adding a prescribed amount of water with stirring.

The abrasives composition in accordance with the present invention can be used in any of the abrasive processing steps for the production of substrates for magnetic recording media. For example, the abrasives composition in accordance with the present invention can be used in the aforesaid lapping step and the polishing step. The abrasives composition in accordance with the present invention is preferably used in the polishing step. When the abrasives composition in accordance with the present invention is used for the abrasive processing of a carbon substrate, the lapping step may be carried out before or after the step of calcining a cured resin piece of a disk shape and thereby obtaining the carbon substrate (calcination and carbonization step).

There is no limitation on the substrate for the magnetic recording medium to be abraded with the abrading composition of the present invention. When the object to be abraded is a carbon substrate, a NiP-plated Al substrate, or the like, a very high abrasion speed and a very low surface roughness can be obtained.

No limitation is imposed on how the carbon substrate is produced. For example, the carbon substrate may be produced by curing a resin between a pair of glass plates, forming the cured resin into a disk shape and coring the cured resin, and calcining the cured resin thus obtained. Alternatively, the carbon substrate may be produced with the HIP (hot isostatic pressing) technique. Also, no limitation is imposed on the kind of the carbon substrate. For example, an amorphous carbon substrate and a glass-like carbon substrate may be utilized.

A preferable process for producing substrate for magnetic recording media, in which the abrasive processing step is carried out with the abrasives composition in accordance with the present invention, will be described hereinbelow with reference to FIGS. 1 and 2 by taking the polishing step for a carbon substrate as an example.

FIG. 1 is a schematic front view showing a double-face abrasive processing machine, which may be used in a polishing step in the production of carbon substrates for magnetic recording media. FIG. 2 is a view taken perpendicular to the line X—X of FIG. 1.

Figure 2:
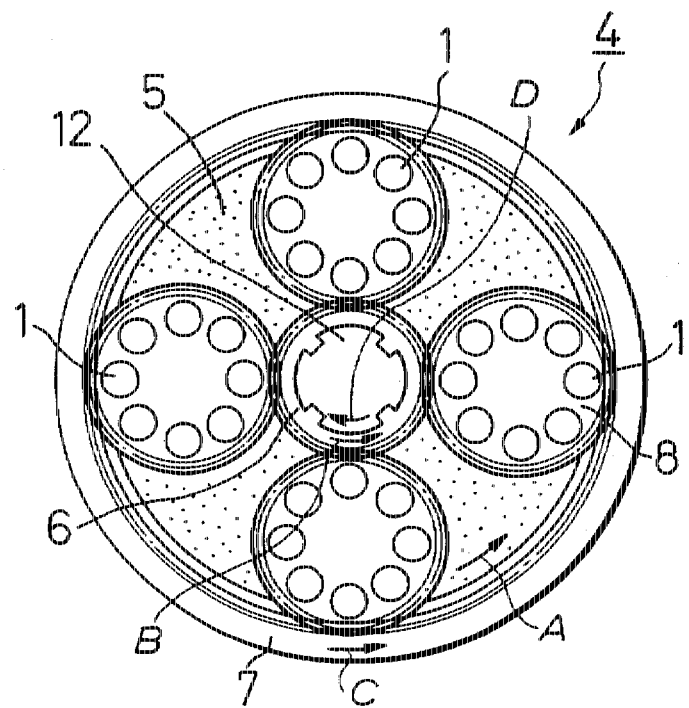
FIG. 2 is a view taken perpendicular to the line X—X of FIG. 1.

With reference to FIGS. 1 and 2, a double-face abrasive processing machine 2 is provided with a base 3 and a lower platen 4, which is located on the base 3 and rotates in the direction indicated by the arrow A. An abrasion pad 5 is fitted to the upper surface of the lower platen 4.

As illustrated in FIG. 2, a plurality of planet gear-like carriers 8 are located on the upper side of the lower platen 4. Each carrier 8 is engaged with a sun gear 6, which is located at the center of the lower platen 4 and rotates in the direction indicated by the arrow B, and an internal gear 7, which is located on the outer circumference of the lower platen 4 and rotates in the direction indicated by the arrow C. Thus each carrier 8 rotates around the sun gear 6 and around its own axis. Each carrier 8 has a plurality of holes, and glass-like carbon substrates 1 serving as work pieces are respectively set in the holes.

Also, as illustrated in FIG. 1, an upper platen 9 is located above the lower platen 4 and the carriers 8. An abrasion pad (not shown) is fitted to the lower surface of the upper platen 9. The upper platen 9 is rotatably mounted on a bracket 11, which is fitted to the end of the output rod of an air cylinder 10. The upper platen 9 can be moved up and down by the air cylinder 10. When the upper platen 9 is moved down, it is engaged with grooves of a rotor 12 on the base side. The rotor 12 rotates in the direction indicated by the arrow D in FIG. 2, and the associated upper platen 9 rotates in the same direction.

The abrasives composition in accordance with the present invention is supplied from a slurry feed pipe (not shown) to the position between the upper platen 9 and the lower platen 4.

When the upper platen 9 is moved down by the air cylinder 10, the glass-like carbon substrates 1, which move together with each carrier 8, are sandwiched between the lower platen 4 and the upper platen 9. In this manner, the abrasive processing is carried out.

The production of carbon substrates by the aforesaid double-face abrasive processing machine will further be illustrated hereinbelow. The carbon substrates having been calcined in accordance with a conventional procedure are subjected to the lapping step for obtaining the flatness and the surface roughness required for the final products. Thereafter, the carbon substrates are subjected to a chamfering step of chamfering the inner circumferential edge and the outer circumferential edge. The carbon substrates are then subjected to the polishing step in which the aforesaid double-face abrasive processing machine is used. In this manner, the final product having a prescribed surface roughness is obtained.

The conditions, under which the carbon substrates are polished with the aforesaid double-face abrasive processing machine, may vary in accordance with the type of the carbon substrates, the quality required for the final product, the type of the abrasive, and the like. In general, the polishing step for the carbon substrates may be carried out under the conditions described below.

Specifically, the processing pressure is preferably 10 to 2,000 g/cm$^2$, and more preferably 30 to 300 g/cm$^2$.

The processing time is preferably 2 to 120 minutes, and is more preferably 2 to 30 minutes.

The hardness [according to JIS A(JIS K-6301)] of the abrasion pad fitted to the platen of the double-face abrasive processing machine is preferably 40 to 100, and more preferably 60 to 100.

The rotation speed of the lower platen of the double-face abrasive processing machine may vary in accordance with the size of the abrasive processing machine. For example, as for a 9B type double-face abrasive processing machine supplied by SPEED FAM CO., the rotation speed of the lower platen is preferably 10 to 100 rpm, and more preferably 10 to 60 rpm.

The feed rate of the abrasives composition may vary in accordance with the size of the abrasive processing machine. For example, as for the 9B type double-face abrasive processing machine supplied by SPEED FAM CO., the feed rate of the abrasives composition is preferably 5 to 300 cc/min, and is more preferably 10 to 150 cc/min.

The preferred process for producing substrates for magnetic recording media, in which the abrasive processing step is carried out with the abrasives composition in accordance with the present invention, is described above. However, the process is not limited to the embodiment described above and may be applied to, for example, NiP-plated substrates. Also, the process for producing substrates for magnetic recording media may be applied to the lapping step.

Alternatively, in the present invention, the substrate may be abraded with grinders made of fixed particles of an abrasive fitted in place of the abrasive pads to the upper and lower platens of the double-face abrasive processing machine while an aqueous solution containing the abrasion accelerator in a predetermined concentration is supplied to between the upper and lower platens. Such an abrasive processing technique should preferably be employed in the lapping step and the polishing step.

Other features of the invention will become apparent in the course of the following descriptions of exemplary embodiments which are given for illustration of the invention and are not intended to be limiting thereof.

EXAMPLES

Examples 1 and 2, and Comparative Examples 1, 2 and 3

Substrates having a diameter of 2.5 inches were obtained by carrying out a lapping operation with SiC particles having a particle size of 9.5 μm in the double-face abrasive processing machine. The substrates were then polished with the abrasives compositions for the production of substrates for magnetic recording media, which had the formulation listed in Table 1 shown below. The abrasion speed of the substrates and the surface roughness, Ra, of the substrates after abrasion were measured with the methods described later. The results listed in Table 1 were obtained.

In Examples 1 and 2 and Comparative Examples 1, 2, and 3, the substrates listed in Table 1 were used. The double-face abrasive processing machine was operated under the setting conditions shown below.

Setting conditions of double-face abrasive processing machine

Double-face abrasive processing machine used:
    9B type double-face abrasive processing machine manufactured by SPEED FAM CO.
Processing pressure: 150 g/cm$^2$
Processing time: 30 min.
Hardness of abrasion pad: 90
Rotation speed of lower platen: 40 rpm
Feed rate of abrasives composition: 50 cc/min
Method for measuring the abrasion speed The difference between the thickness of the substrate before being abraded and the thickness of the substrate after being abraded was measured. The value of the difference was divided by the processing time (30 minutes), and the abrasion speed was thereby calculated.

Method for measuring the surface roughness, Ra

The surface roughness Ra was measured with a stylus type of surface texture measuring instrument (TENCOR P2) and under the conditions described below.

Figure 3:
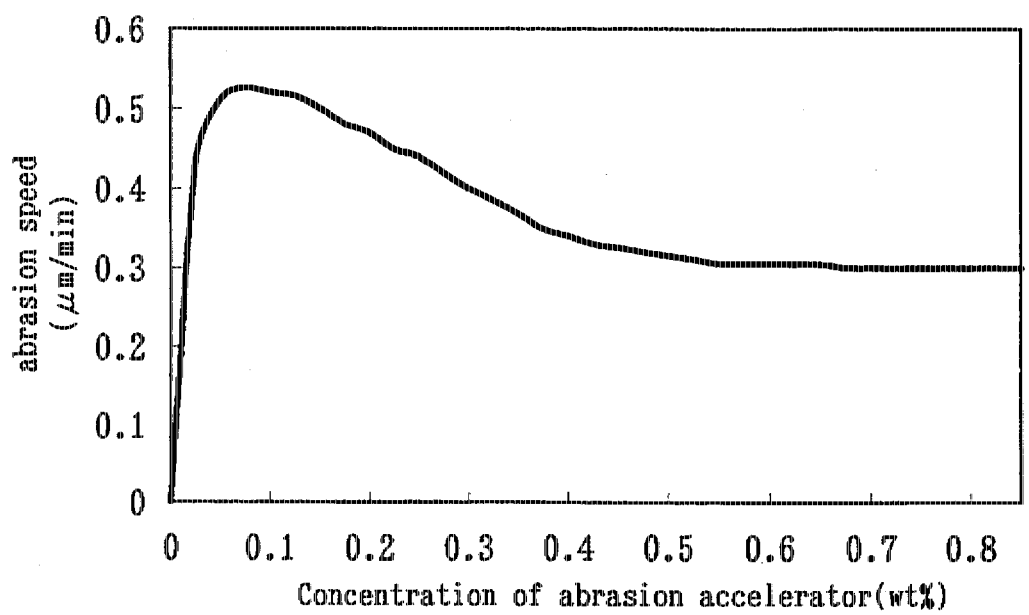
FIG. 3 is a graph showing the relationship between the concentration of an abrasion accelerator in an abrasives composition for the production of substrates for magnetic recording media and the abrasion speed.
Figure 4:
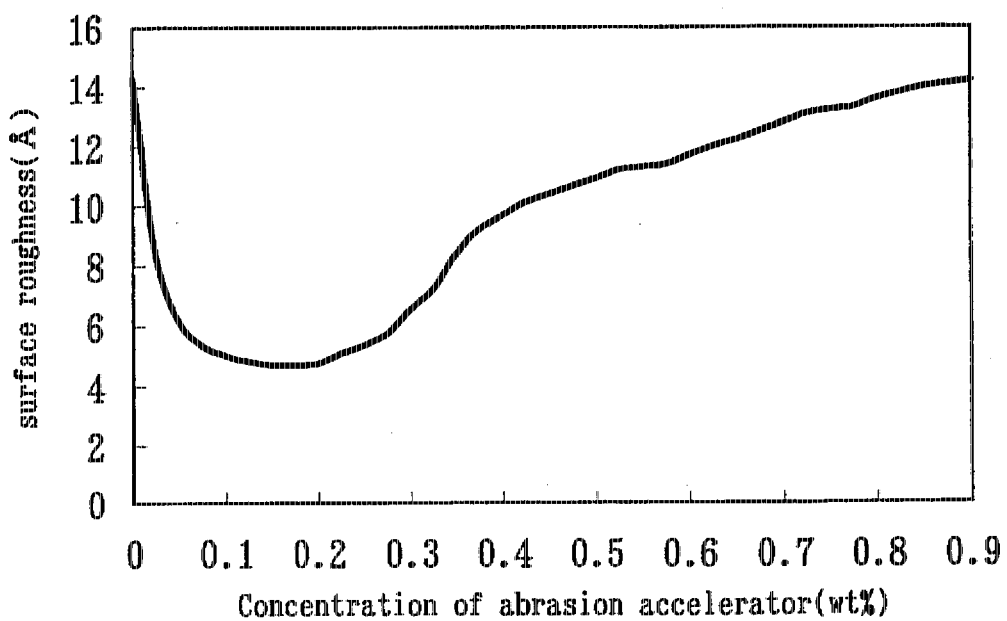
FIG. 4 is a graph showing the relationship between the concentration of an abrasion accelerator in an abrasives composition for the production of substrates for magnetic recording media and the surface roughness, Ra, of an abraded carbon substrate.

Stylus diameter: 0.6 μm (radius of curvature of the stylus)
Stylus pushing pressure: 7 mg
Measuring length: 250 μm×8 positions
Tracing speed: 2.5 μm/sec
Cut-off value: 1.25 μm (low pass filter)

of the amorphous carbon substrates after abrasion) were obtained. FIG. 3 is a graph showing the relationship between the concentration of the abrasion accelerator in the abrasives composition for the production of substrates for magnetic recording media and the abrasion speed. FIG. 4 is a graph showing the relationship between the concentration of the abrasion accelerator in the abrasives composition for the production of substrates for magnetic recording media and the surface roughness, Ra, of the abraded carbon substrate.

As is clear from FIGS. 3 and 4, when the substrates are abraded with the abrasives composition, which contains 0.02% to 0.4% by weight of aluminum lactate as the abrasion accelerator, the surface roughness of the substrates after abrasion can be reduced to a markedly low value, and the abrasion speed can be markedly increased.

TABLE 1

| | | Abrasion accelerator | | Abrasives | | | | | Abrasion speed (μm/min) | Surface roughness (Å) |
|---|---|---|---|---|---|---|---|---|---|---|
| | Substrate | Type | Conc. (wt %) | Type | Mean particle size*1 (μm) | Max. particle size*2 (μm) | Conc. (wt %) | Water | pH*3 | | |
| Examples | | | | | | | | | | | |
| 1 | Amorphous carbon | Aluminum lactate | 0.05 | Calcined alumina | 1.2 | 5 | 1.0 | Balance | 4.8 | 0.51 | 6.1 |
| 2 | Ni—P plated Al | Aluminum lactate | 0.35 | Calcined alumina | 1.2 | 5 | 1.0 | Balance | 4.8 | 0.38 | 11.2 |
| Comparative Examples | | | | | | | | | | | |
| 1 | Amorphous carbon | None | — | Calcined alumina | 1.2 | 5 | 1.0 | Balance | 4.8 | 0.02 | 26.5 |
| 2 | Amorphous carbon | Aluminum nitrate | 0.05 | Calcined alumina | 1.2 | 5 | 1.0 | Balance | 4.8 | 0.10 | 15.8 |
| 3 | Amorphous carbon | Aluminum nitrate | 1.00 | Calcined alumina | 1.2 | 5 | 1.0 | Balance | 4.8 | 0.11 | 13.5 |

*1 Mean particle size of primary particles.
*2 Maximum particle size of primary particles.
*3 The pH value was adjusted by the addition of a 1N aqueous solution of acetic acid or a 1N aqueous solution of sodium bicarbonate.

As is clear from the results shown in Table 1, when the substrates are abraded with the abrasives compositions in accordance with the present invention, which contain the prescribed concentration of aluminum lactate (Examples 1 and 2), the surface roughness of the abraded substrates is lower and the abrasion speed is higher than when the substrates are abraded with the abrasives compositions which do not contain aluminum lactate (Comparative Examples 1, 2, and 3).

Example 3

This example demonstrates that the content of aluminum lactate (serving as the abrasion accelerator) in the abrasives composition for the production of substrates for magnetic recording media in accordance with the present invention is preferably 0.02% to 0.4% by weight.

Various abrasives compositions were prepared by varying the amount of aluminum lactate in the abrasives composition of Example 1 within the range of 0% to 1.0% by weight. In the same manner as that in Example 1, amorphous carbon substrates were polished with the abrasives compositions having thus been prepared.

The abrasion speed of the amorphous carbon substrates and the surface roughness, Ra, of the amorphous carbon substrates after abrasion were measured in the same manner as that in Example 1. The results shown in FIG. 3 (for the abrasion speed) and FIG. 4 (for the surface roughness, Ra, This application is based on Japanese Patent Application No. 7-341720, which was filed on Dec. 27, 1995 and which is incorporated herein by reference in its entirety.

Obviously, numerous modifications and variations of the present invention are possible in light of the above teaching. It is therefore to be understood that, within the scope of the appended claims, the invention may be practiced otherwise than as specifically described therein.

What is claimed as new and desired to be secured by Letters Patent of United States is:

1. An abrasives composition, comprising
   (i) an abrasive;
   (ii) an abrasion accelerator, and
   (iii) water,
   wherein said abrasion accelerator is aluminum lactate and said abrasion accelerator is present in an amount of 0.02 to 0.4% by weight, based on the total weight of said composition.

2. The abrasives composition according to claim 1, wherein said abrasive comprises an alumina abrasive.

3. The abrasives composition according to claim 1, wherein said abrasive is present in an amount of 0.05 to 30% by weight, based on the total weight of said composition, and said abrasive has a mean particle size of primary particles of 0.001 to 6 μm and a maximum particle size of primary particles of 15 μm or smaller.

4. The abrasives composition according to claim 1, wherein said abrasives composition has a pH value of 3.0 to 5.5.

5. The abrasives composition according to claim 1, wherein said substrate comprises carbon or NiP-plated aluminum.

6. The abrasives composition according to claim 1, wherein said abrasive is present in an amount of 0.1 to 25% by weight, based on the total weight of said composition.

7. The abrasives composition according to claim 1, wherein said abrasion accelerator is present in an amount of 0.05 to 0.4% by weight, based on the total weight of said composition.

8. The abrasives composition according to claim 1, wherein said abrasive has a mean particle size of primary particles of 0.01 µm to 3 µm.

9. The abrasives composition according to claim 1, wherein said abrasive has a maximum particle size of primary particles of 6 µm or less.

10. The abrasives composition according to claim 1, wherein said water is present in an amount of 69.3 to 99.93% by weight, based on the total weight of said composition.

11. In a process for producing a substrate for a magnetic recording medium, comprising abrading said substrate with an abrasives composition, the improvement comprising said abrasives composition comprising:

(i) an abrasive;

(ii) an abrasion accelerator; and (iii) water, wherein said abrasion accelerator is aluminum lactate and said abrasion accelerator is present in an amount of 0.02 to 0.4% by weight, based on the total weight of said composition.

12. The process according to claim 11, wherein said abrasive comprises an alumina abrasive.

13. The process according to claim 11, wherein said abrasive is present in said composition in an amount of 0.05 to 30% by weight, based on the total weight of said composition, and said abrasive has a mean particle size of primary particles of 0.001 to 6 µm and a maximum particle size of primary particles of 15 µm or smaller.

14. The process according to claim 11, wherein said abrasives composition has a pH value of 3.0 to 5.5.

15. The process according to claim 11, wherein said substrate comprises carbon or NiP-plated aluminum.

16. The process according to claim 11, wherein said abrasive is present in said composition in an amount of 0.1 to 25% by weight, based on the total weight of said composition.

17. The process according to claim 11, wherein said abrasion accelerator is present in said composition in an amount of 0.05 to 0.4% by weight, based on the total weight of said composition.

18. The process according to claim 11, wherein said abrasive has a mean particle size of primary particles of 0.01 µm to 3 µm.

19. The process according to claim 11, wherein said abrasive has a maximum particle size of primary particles of 6 µm or less.

20. The process according to claim 11, wherein said water is present in said composition in an amount of 69.3 to 99.93% by weight, based on the total weight of said composition.

* * * * *